United States Patent
Odaka et al.

(10) Patent No.: US 9,309,946 B1
(45) Date of Patent: Apr. 12, 2016

(54) CYLINDER WITH SHOCK ABSORBING FUNCTION

(71) Applicant: Komatsu Ltd., Tokyo (JP)

(72) Inventors: Hisatoshi Odaka, Koriyama (JP); Atsushi Satou, Isehara (JP); Yoshio Hoshino, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/411,958

(22) PCT Filed: Sep. 26, 2014

(86) PCT No.: PCT/JP2014/075686
§ 371 (c)(1),
(2) Date: Dec. 30, 2014

(87) PCT Pub. No.: WO2015/050063
PCT Pub. Date: Apr. 9, 2015

(51) Int. Cl.
*F16F 9/34* (2006.01)
*F16F 9/348* (2006.01)
*F16F 9/32* (2006.01)

(52) U.S. Cl.
CPC ............. *F16F 9/3482* (2013.01); *F16F 9/3292* (2013.01)

(58) Field of Classification Search
CPC ....... F16F 9/3292; F16F 9/3482; F15B 15/22; F15B 15/28; F15B 15/225; F15B 15/2815; F15B 15/1428; F15B 15/1452
USPC ............ 188/322.15, 322.17, 322.18, 322.19, 188/322.22; 91/401, 422; 92/258
See application file for complete search history.

(56) References Cited

U.S. PATENT DOCUMENTS

| | | | |
|---|---|---|---|
| 3,023,740 A | 3/1962 | Samuel, Jr. et al. | |
| 3,311,026 A | 3/1967 | Crisp | |
| 3,654,834 A | 4/1972 | Sifri et al. | |
| 5,009,450 A * | 4/1991 | Herberg | B60G 17/01933 188/266.1 |
| 2004/0124049 A1* | 7/2004 | St. Clair | B60N 2/501 188/266 |

FOREIGN PATENT DOCUMENTS

| | | |
|---|---|---|
| JP | 47-050906 B1 | 12/1972 |
| JP | 52-34393 U | 3/1977 |
| JP | 62-40308 U * | 3/1987 |
| JP | 62-124302 A | 6/1987 |

(Continued)

OTHER PUBLICATIONS

International Search Report and Written Opinion mailed Dec. 22, 2014, issued for PCT/JP2014/075686.

(Continued)

*Primary Examiner* — Pamela Rodriguez
(74) *Attorney, Agent, or Firm* — Locke Lord LLP (57) ABSTRACT

A cylinder with a shock absorbing function which can detect a position of a piston rod reciprocating in a cylinder tube and has a function of absorbing shock produced by the piston rod at its stroke end includes: a pair of piston valve sheets provided in a piston unit; a piston valve configured to reciprocate within a range between the piston valve sheets; a slider made of a nonmagnetic material slidably fitted onto the piston rod; a valve piston provided in the piston unit; a magnet holder ring attached to the piston rod so as to be positioned between the piston unit and the slider; and a magnetism detector provided on an outer periphery of the cylinder tube and configured to detect a position of the piston rod by detecting magnetism generated by the magnet.

4 Claims, 11 Drawing Sheets

(56) References Cited

FOREIGN PATENT DOCUMENTS

| JP | 02-038704 A | 2/1990 |
| JP | 7-99166 B2 | 10/1995 |
| JP | 2006-220621 A | 8/2006 |

OTHER PUBLICATIONS

Decision of a Patent Grant mailed Mar. 3, 2015 in corresponding Japanese application 2014-548232.

* cited by examiner

CYLINDER WITH SHOCK ABSORBING FUNCTION

FIELD

The present invention relates to a cylinder with a shock absorbing function having high operability allowing a piston rod to move fast with a slight amount of working fluid introduced to a piston unit even when a magnet for detecting a position is provided close to the piston unit.

BACKGROUND

A known cylinder is provided with a permanent magnet on a piston unit, which reciprocates together with a piston rod in a cylinder tube such as a hydraulic cylinder, and a magnetic sensor on the exterior of the cylinder tube to detect magnetism passing through the magnetic sensor, thereby measuring a cylinder stroke position.

For example, Patent Literature 1 discloses a cylinder including a rotary encoder, provided on a cylinder head, for detecting the amount of reciprocating motion of the piston rod as the amount of rotation and a resetting magnetic sensor on the middle portion of the outer periphery of a tube. The resetting magnetic sensor detects the magnetism generated by a magnet secured on the piston unit reciprocating in the tube and resets the measured position obtained from the value detected by the rotary encoder to an origin position when the a peak value of magnetism is detected.

Patent Literature 2 discloses a cylinder including a piston which reciprocates in the cylinder, a communication hole penetrating the piston in the direction of the reciprocating motion of the piston, and a check valve connected to the communication hole. A valve body of the check valve opens when the piston moves to a stroke end position of the piston to absorb the shock made by the piston making contact with the stroke end.

CITATION LIST

Patent Literature

Patent Literature 1: Japanese Patent Application Laid-open No. 2006-220621
Patent Literature 2: Japanese Patent Application Laid-open No. 62-124302

SUMMARY

Technical Problem

A known cylinder includes a piston valve provided on a piston unit of the above-mentioned cylinder rod to provide a shock absorbing effect similar to that disclosed in Patent Literature 2. This cylinder including the piston valve absorbs the shock produced when the piston rod contacts the stroke end in a manner that, on the piston rod reaching the stroke end of the cylinder, a piston valve sealing the working fluid is pushed to the opposite direction and resultingly releases the seal, thereby discharging the working fluid to reduce the working fluid pressure.

Further, the cylinder including the piston valve allows the piston rod to move toward the middle-stroke position by supplying the piston unit with only a very small amount of flow of working fluid to form a seal with the piston valve so as to block the working fluid from flowing in the piston unit.

When a magnet for detecting a position is provided close to the piston unit including the piston valve, the piston valve made of a magnetic material is magnetized. Further, when the difference between the bore diameter of the cylinder tube and the piston rod diameter is small, making it difficult for the cylinder head to directly push the piston valve, the piston valve is pushed via a slider allowed to slide along the reciprocating direction. Since the slider is made of a magnetic material, the slider adheres to the magnetized piston valve by magnetism of the magnetized piston valve.

Therefore, the piston valve is adhering to the slider when the piston rod is to be moved from the stroke end at the cylinder head toward the middle-stroke position. To move the piston rod toward the middle-stroke position, a seal should be formed with the piston valve by moving the piston valve with working fluid introduced from the cylinder head. However, when the range of motion of the slider is small compared to the range of motion of the piston valve, a force greater than the attraction force between the piston valve and the slider needs to be applied to the piston valve. The force applied to the piston valve is equivalent to the pressure loss of the working fluid flowing along the piston valve. The pressure loss is small when the flow of working fluid is small. Accordingly, in the initial operational range in moving the piston rod where the amount of flow of working fluid is very small, the force applied to the piston valve is small compared to the attraction force between the piston valve and the slider, resulting in longer time before a seal is formed with the piston valve. Consequently, an operator feels a time lag which deteriorates the operability when reciprocating the piston rod, causing disadvantage.

The present invention is made in view of the above-described problem. The object of the present invention is to provide a cylinder with a shock absorbing function having high operability allowing a piston rod to move fast with a slight amount of working fluid introduced to a piston unit even when a magnet for detecting a position is provided close to the piston unit.

Solution to Problem

To solve the above-described problem and achieve the object, a cylinder with a shock absorbing function according to the present invention can detect a position of a piston rod reciprocating in a cylinder tube and has a function of absorbing shock produced by the piston rod at its stroke end. The cylinder with a shock absorbing function includes: a pair of piston valve sheets provided in a piston unit attached to a region of the piston rod closer to a cylinder bottom, one of the pair of piston valve sheets being disposed closer to a cylinder head and the other being disposed closer to a cylinder bottom; a piston valve configured to reciprocate within a range between the piston valve sheets in a manner that the piston valve is moved toward the cylinder bottom by working fluid introduced from a cylinder head side oil chamber to form a seal between the piston valve and the piston valve sheet disposed closer to the cylinder bottom so as to prevent the working fluid from flowing out toward the cylinder bottom, and that the piston valve is moved toward the cylinder head by working fluid introduced from a cylinder bottom side oil chamber to form a seal between the piston valve and the piston valve sheet disposed closer to the cylinder head so as to prevent the working fluid from flowing out toward the cylinder head; a slider made of a nonmagnetic material slidably fitted onto the piston rod and allowed to make contact with the cylinder head and a cylinder head side operating piece of the piston valve; a valve piston provided in the piston unit in a region closer to the cylinder bottom and configured to push the piston valve toward the cylinder head when the piston rod contacts a stroke end at the cylinder bottom, thereby releasing a seal formed between the piston valve and the piston valve sheet disposed closer to the cylinder bottom; a magnet holder ring attached to the piston rod so as to be positioned between the piston unit and the slider, and configured to secure a magnet for detecting a position of the piston rod on a side facing the piston unit; and a magnetism detector provided on an outer periphery of the cylinder tube and configured to detect a position of the piston rod by detecting magnetism generated by the magnet.

Moreover, in the above-described cylinder with a shock absorbing function according to the present invention, the cylinder head side operating piece of the piston valve is longer than a length allowing the piston valve to be kept in contact with the slider while the piston valve is moving within a range between the pair of piston valve sheets.

Moreover, the above-described cylinder with a shock absorbing function according to the present invention further includes a retainer provided between the piston unit and the magnet holder ring, and configured to secure the piston valve sheet disposed closer to the cylinder head and the magnet in the magnet holder ring in position, the retainer forming a passage for introducing working fluid in a region between the pair of piston valve sheets.

Advantageous Effects of Invention

According to the present invention, a slider made of a nonmagnetic material contacts, without adhering to, a magnetized cylinder head side operating piece. Thus, the flow of the working fluid to separate the slider and the cylinder head side operating piece from the magnetically adhering state is not required. As a result, a cylinder with a shock absorbing function having high operability allowing a piston rod to move fast with a slight amount of working fluid introduced to a piston unit even when a magnet for detecting a position is provided close to the piston unit can be provided.

DESCRIPTION OF EMBODIMENTS

An embodiment of the present invention will be described below with reference to the attached drawings.
(Cylinder Structure)

Figure 1:
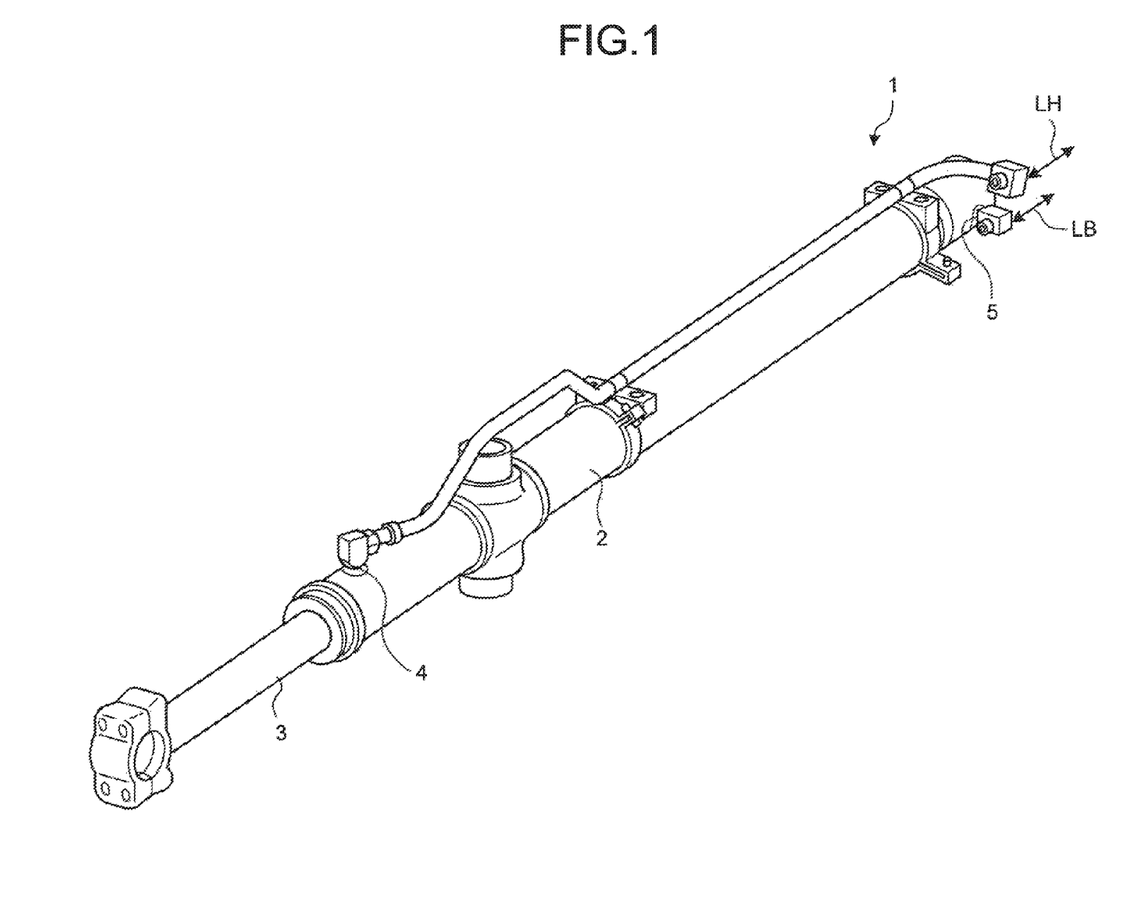
FIG. 1 illustrates an external configuration of a cylinder with a shock absorbing function, which is an embodiment of the present invention.
Figure 2:
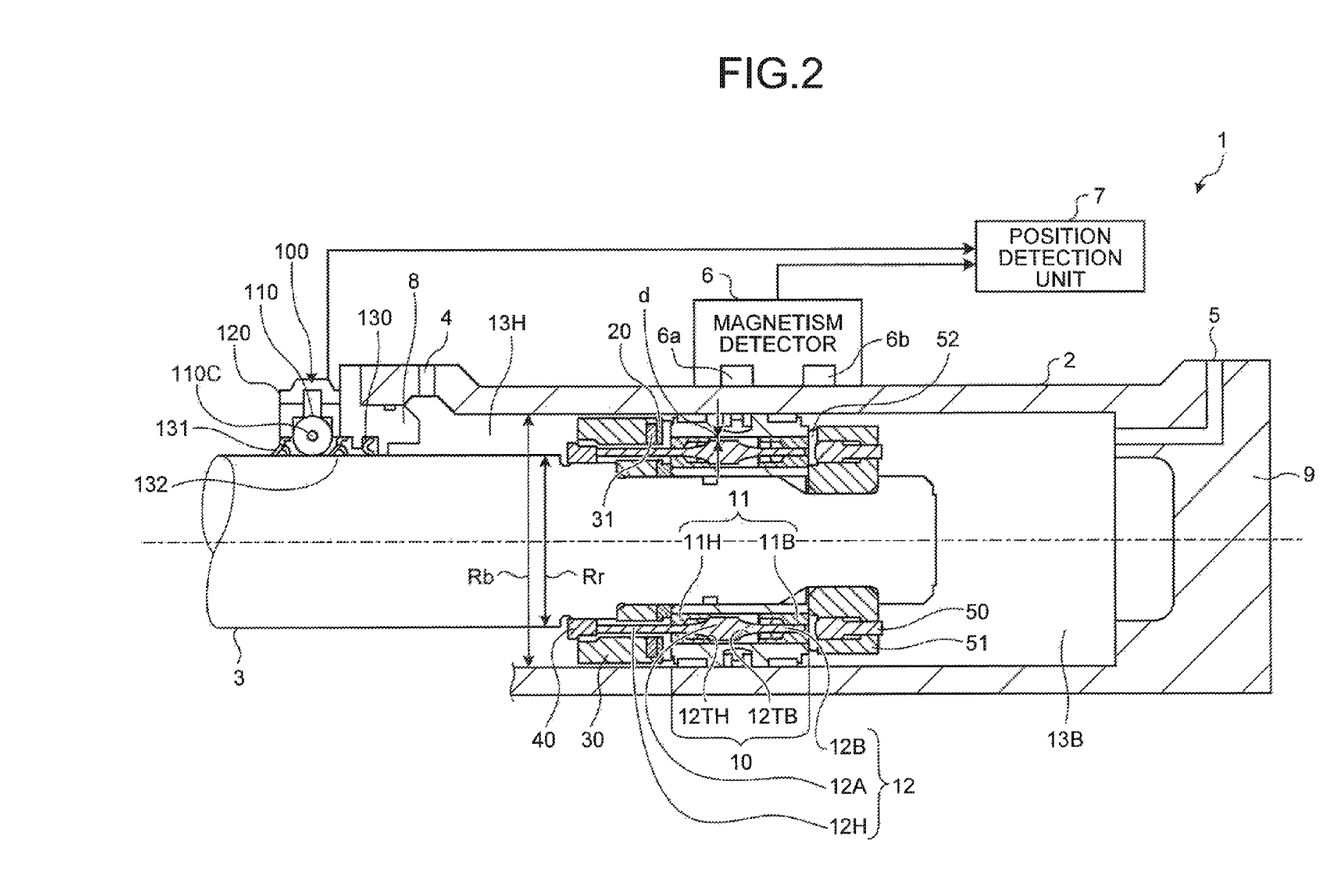
FIG. 2 is a sectional view illustrating a detailed configuration of the cylinder illustrated in FIG. 1.
Figure 3:
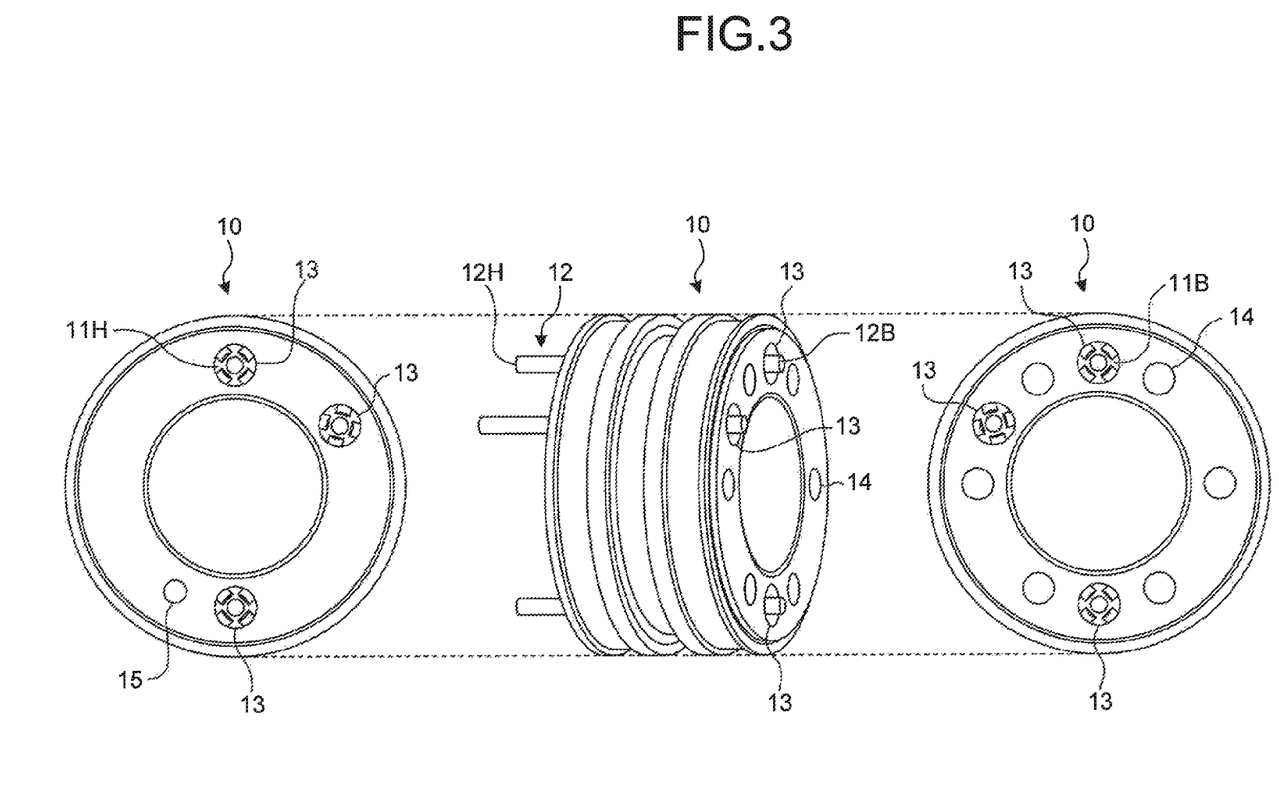
FIG. 3 illustrates a perspective view, a right side view, and a left side view, each correspondingly illustrating a detailed configuration of a piston unit illustrated in FIG. 2.
Figure 4:
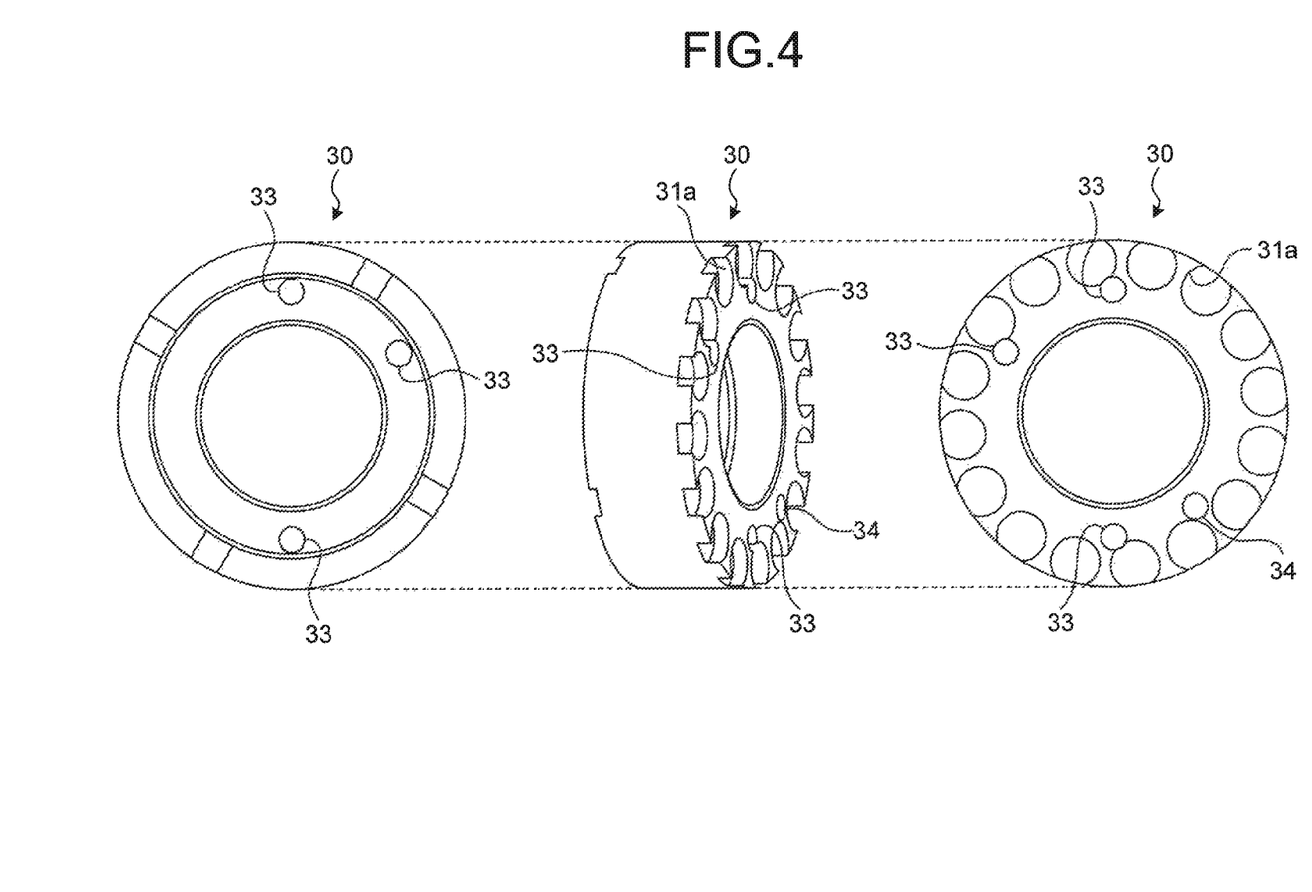
FIG. 4 illustrates a perspective view, a right side view, and a left side view, each correspondingly illustrating a detailed configuration of a magnet holder ring illustrated in FIG. 2.
Figure 5:
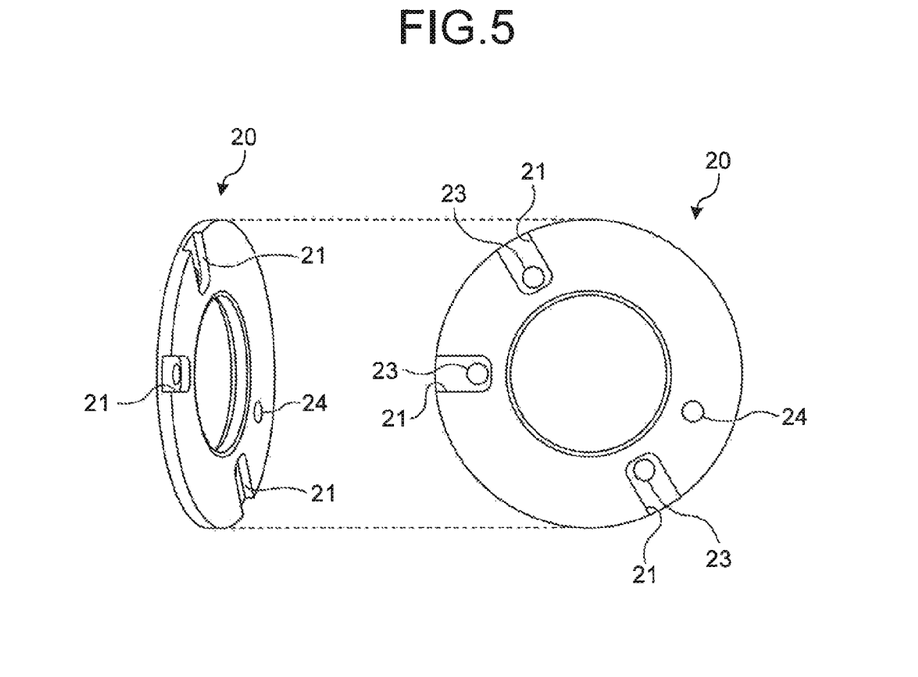
FIG. 5 illustrates a perspective view and a right side view each correspondingly illustrating a detailed configuration of a retainer illustrated in FIG. 2.
Figure 6:
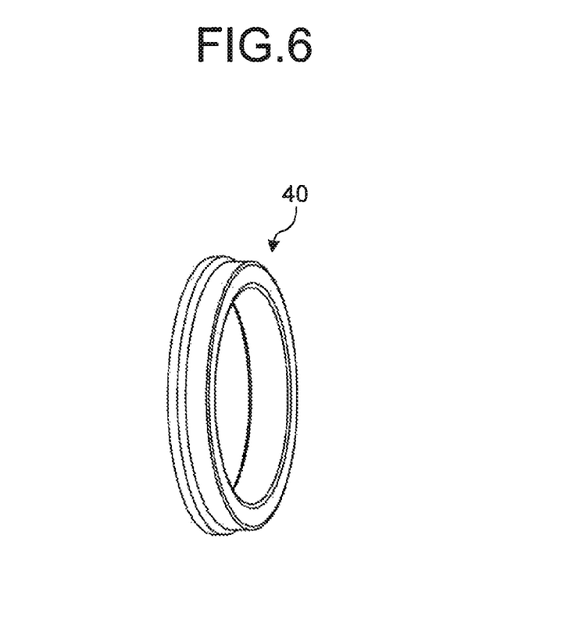
FIG. 6 illustrates a perspective view illustrating a detailed configuration of a slider illustrated in FIG. 2.

FIG. 1 illustrates an external configuration of a cylinder with a shock absorbing function (hereinafter referred to as "cylinder"), which is an embodiment of the present invention. FIG. 2 is a sectional view illustrating a detailed configuration of the cylinder illustrated in FIG. 1. FIG. 3 illustrates a perspective view, a right side view, and a left side view, each correspondingly illustrating a detailed configuration of a piston unit illustrated in FIG. 2. FIG. 4 illustrates a perspective view, a right side view, and a left side view, each correspondingly illustrating a detailed configuration of a magnet holder ring illustrated in FIG. 2. FIG. 5 illustrates a perspective view and a right side view each correspondingly illustrating a detailed configuration of a retainer illustrated in FIG. 2. FIG. 6 illustrates a perspective view illustrating a detailed configuration of a slider illustrated in FIG. 2.

As illustrated in FIGS. 1 and 2, a piston rod 3 is provided to slide along a cylinder tube 2, which is a wall of a cylinder 1, via a piston unit 10. The piston unit 10 is attached, closer to a cylinder bottom 9, on the piston rod 3. The piston rod 3 is slidably attached to a cylinder head 8. A chamber surrounded by the cylinder head 8, the piston unit 10, an inner wall of the cylinder tube 2, and the piston rod 3 forms a cylinder head side oil chamber 13H. A chamber surrounded by the cylinder bottom 9, the piston unit 10, the inner wall of the cylinder tube 2, and the piston rod 3 forms a cylinder bottom side oil chamber 13B. In the cylinder tube 2, the cylinder head side oil chamber 13H and the cylinder bottom side oil chamber 13B are disposed to oppose each other with the piston unit 10 in between. Working fluid LH flows into the cylinder head side oil chamber 13H through a hydraulic port 4 provided closer to the cylinder head 8. Working fluid LB flows into the cylinder bottom side oil chamber 13B through a hydraulic port 5 provided close to the cylinder bottom 9.

Corresponding to the manipulated amount of an manipulation lever (not illustrated), the flow control valve adjusts the flow and switches directions of the working fluids LH and LB supplied from a hydraulic pump (not illustrated). When the working fluid LH flows into the cylinder head side oil chamber 13H through the hydraulic port 4, the working fluid LH pushes the piston unit 10 toward the cylinder bottom 9 to move the piston rod 3 toward the cylinder bottom 9. The working fluid LB in the cylinder bottom side oil chamber 13B then flows out into a working fluid tank (not illustrated) through the hydraulic port 5. On the other hand, when the working fluid LB flows into the cylinder bottom side oil chamber 13B through the hydraulic port 5, the working fluid LB pushes the piston unit 10 toward the cylinder head 8 to move the piston rod 3 toward the cylinder head 8. The working fluid LH in the cylinder head side oil chamber 13H then flows out into the working fluid tank (not illustrated) through the hydraulic port 4. Accordingly, the piston rod 3 reciprocates in the cylinder tube 2 by the working fluid LH or LB flowing into the cylinder tube 2.

The cylinder head 8 is provided with a rod seal 130 and a dust seal 132 which seal the gap between the cylinder head and the piston rod 3 to prevent contamination, such as dust, from intruding into the cylinder head side oil chamber 13H.

(Stroke Position Detection Mechanism)

A stroke position sensor 100 is externally provided on the cylinder head 8. A case 120 covers the stroke position sensor 100. The case 120 is secured to the cylinder head 8 by means of fastening with bolts or the like. That is, the stroke position sensor 100 and the case 120 can easily be attached to and detached from the cylinder tube 2.

The stroke position sensor 100 includes a spin roller 110, which makes surface-to-surface contact with the piston rod 3 and is configured to rotate in response to the reciprocating motion of the piston rod 3. That is, the amount of linear motion of the piston rod 3 is converted into the amount of rotation of the spin roller 110.

The spin roller 110 is provided so that a rotational axis 110C of the spin roller 110 is perpendicular to the reciprocating direction of the piston rod 3. A dust seal 131 is provided on the case 120 to seal the gap between the case 120 and the piston rod 3 and to prevent contamination, such as dust, from intruding into the space between the spin roller 110 and the piston rod 3. This prevents dust or the like from intruding into the space between the spin roller 110 and the piston rod 3 and causing malfunction of the spin roller 110. That is, a dust prevention structure configured of the dust seal 130 provided on the case 120 and the dust seal 132 provided on the cylinder head 8 is formed in the stroke position sensor 100.

The stroke position sensor 100 includes the spin roller 110 and a rotation sensor unit (not illustrated) for detecting the amount of rotation of the spin roller 110. A signal indicating the amount of rotation of the spin roller 110 detected by the rotation sensor unit is transmitted to a position detection unit 7 to be converted into the stroke position of the piston rod 3.

A slip (slipping) inevitably occurs between the spin roller 110 of the stroke position sensor 100 and the piston rod 3, thereby producing an error (accumulated error caused by a slip) between the measured position of the piston rod 3 obtained from a value detected by the stroke position sensor 100 and the actual position of the piston rod 3. To reset the measured position obtained from the value detected by the stroke position sensor 100 to an origin position (reference position), a magnet 31 generating lines of magnetic force is securely provided near the piston unit 10 and a magnetism detector 6 is externally provided on the cylinder tube 2 as a resetting sensor. The magnetism detector 6 detects a peak of the lines of magnetic force generated by the magnet 31. The position detection unit 7 corrects the measured position obtained from the value detected by the stroke position sensor 100 to the origin position according to the value detected by the magnetism detector 6.

The magnet 31 is positioned in a magnet holder ring 30 with the S pole and the N pole aligned along the reciprocating direction of the piston rod 3. The magnet 31 may be positioned so that the S pole and the N pole are aligned along the radial direction perpendicular to the reciprocating direction of the piston rod 3.

The magnetism detector 6 includes two magnetic sensors 6a and 6b arranged separate from each other by a predetermined distance along the reciprocating direction. The two magnetic sensors 6a and 6b are provided because they detect positions based on which the absolute distance of motion of the piston rod 3 is measured. The measured absolute distance of motion of the piston rod 3 is used to correct the stroke. For example, when the spin roller 110 of the stroke position sensor 100 degrades due to aging, the distance of motion of the piston rod 3 obtained from the amount of rotation detected by the stroke position sensor 100 will be smaller than the actual distance of motion of the piston rod 3. The position detection unit 7 can correct the distance of motion obtained from the amount of rotation detected by the stroke position sensor 100 according to a ratio of a distance of motion L' and the actual distance L between the two magnetic sensors 6a and 6b', that is, L/L', where the distance of motion L' is obtained from the amount of rotation detected by the stroke position sensor 100 when the magnet 31 travels between the two magnetic sensors 6a and 6b. For example, a Hall-IC is used as the magnetic sensors 6a and 6b.

(Structure Around Piston Unit with Shock Absorber)

The piston unit 10 has an annular piston valve structure including a plurality of (for example, three) piston valves 12 as illustrated in FIG. 3. The piston valve structure includes three penetration holes 13 each having a circular cross section and extending along the reciprocating direction of the piston rod 3. A piston valve sheet 11 is attached to the penetration holes 13. A piston valve sheet 11H is attached to the penetration holes 13 on the side closer to the cylinder head 8. A piston valve sheet 11b is attached to the penetration hole 13 on the side closer to the cylinder bottom 9. A hole or a groove allowing the working fluid to flow along the reciprocating direction of the piston rod 3 is formed in each of the piston valve sheets 11H and 11B.

The piston valve 12 includes a piston valve body 12A, a cylinder head side operating piece 12H, and a cylinder bottom side operating piece 12B. The piston valve body 12A can move along the reciprocating direction of the piston rod 3 within the range between the piston valve sheets 11H and 11B with a gap d between the inner surface of the penetration hole 13. The diameter of the piston valve body 12A is larger than the diameter of the cylinder head side operating piece 12H and the diameter of the cylinder bottom side operating piece 12B. Tapered portions 12TH and 12TB are formed at portions where the piston valve body 12A is connected to the cylinder head side operating piece 12H or the cylinder bottom side operating piece 12B, respectively. The cylinder head side operating piece 12H and the cylinder bottom side operating piece 12B penetrate the piston valve sheets 11H and 11B, respectively, and is configured to slide. The piston valve 12 is made of a magnetic material. The piston valve 12 is made of a magnetic material because there is no nonmagnetic material having enough strength against a large force applied to the piston valve 12.

The magnet holder ring 30 is an annular member attached to the piston rod 3 so as to be disposed in a region in the piston unit 10 closer to the cylinder head 8. As illustrated in FIG. 4, magnet holders 31a for holding the disk-like magnets 31 are annularly arranged in the magnet holder ring 30 along the outer periphery on the side facing the cylinder bottom 9. The magnets 31 are annularly arranged so that the magnetism detector 6 can detect magnetism even when the piston rod 3 rotates against the cylinder tube 2. A penetration hole 33 penetrated by the cylinder head side operating piece 12H is formed in the magnet holder ring 30. The magnet holder ring 30 is made of a nonmagnetic material.

A retainer 20 is an annular member provided between the piston unit 10 and the magnet holder ring 30. The retainer 20 supports the magnets 31 disposed in the magnet holder ring 30 from the side closer to the cylinder bottom. As illustrated in FIG. 5, a penetration hole 23 through which the cylinder head side operating piece 12H penetrates is formed in the retainer 20. Further, on the side facing the cylinder bottom 9 of the retainer 20, a groove 21 is formed to extend from the outer periphery to where the penetration hole 23 is located. The groove 21 is provided as a passage through which the working fluid flows in and out.

A slider 40 is provided on the side facing the cylinder head 8 of the magnet holder ring 30. As illustrated in FIG. 6, the slider 40 is an annular member slidably fitted in the piston rod 3. The side facing the cylinder head 8 of the slider 40 can contact the cylinder head 8, and the side facing the cylinder bottom 9 of the slider 40 can contact the end of the cylinder head side operating piece 12H. The slider 40 is made of a nonmagnetic material. The slider 40 is provided when the difference between the bore diameter Rb of the cylinder tube 2 and the piston rod diameter Rr is so small that it is difficult for the cylinder head 8 to directly push the piston valve 12. The cylinder head 8 contacts the slider 40 and the slider 40 contacts the piston valve 12.

A valve piston 50 and a valve piston holder 51 are arranged in a region in the piston unit 10 closer to the cylinder bottom. The valve piston holder 51 is an annular member attached to the piston rod 3. The valve piston 50 is provided to be slidable in the reciprocating direction of the piston rod 3 in each of three positions where the piston valves 12 are arranged. The valve piston 50 can contact, with the side facing the cylinder head 8, the end of the cylinder bottom side operating piece 12B. The valve piston 50 can contact, with the side facing the cylinder bottom 9, the cylinder bottom 9. A groove 52 is formed in the valve piston holder 51 on the side facing the piston unit 10 to form a passage allowing the working fluid to flow toward the piston unit 10.

A plurality of blind holes 14 provided in the piston unit 10 illustrated in FIG. 3 is threaded holes for securing the valve piston holder 51. Further, a penetration hole 15 illustrated in FIG. 3, a penetration hole 24 illustrated in FIG. 5, and a through hole 34 illustrated in FIG. 4 are used to determine rotational positions of the piston unit 10, the retainer 20, and the magnet holder ring 30.

(Operation of Piston Valve)

Figure 7:
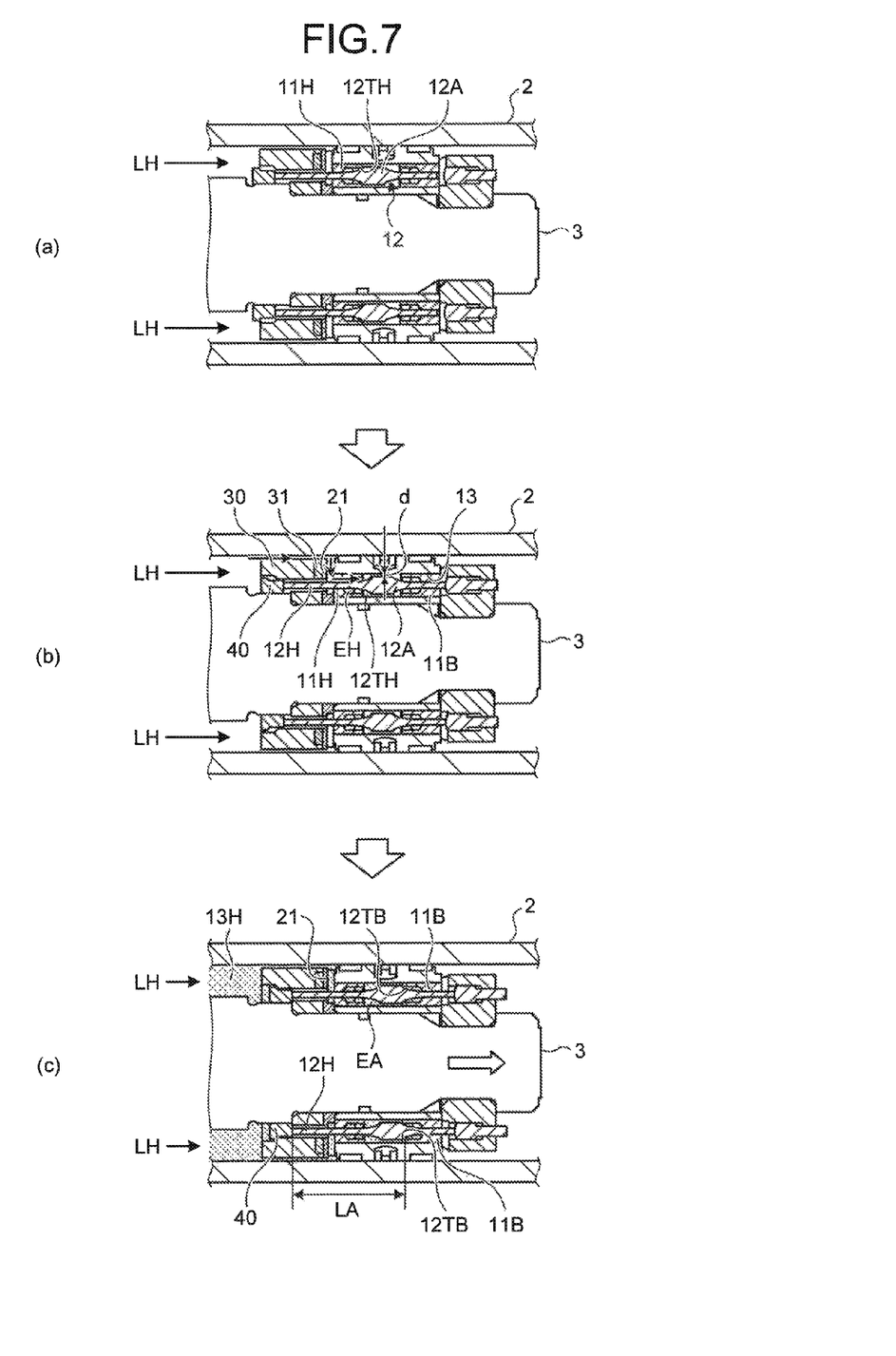
FIG. 7 is an explanatory drawings illustrating a motion of a piston valve when a piston rod moves from a position closer to a cylinder head toward a cylinder bottom.

The operation of the piston valve 12 will now be described with reference to FIGS. 7 to 9. As illustrated in FIG. 7(a), the tapered portion 12TH of the piston valve 12 and the piston valve sheet 11H form a seal in an initial state. When the working fluid LH flows into the cylinder head side oil chamber 13H, the working fluid LH flows into a region EH surrounded by the piston valve sheet 11H and the tapered portion 12TH through the gap between the magnet holder ring 30 and the cylinder tube 2, the groove 21 in the retainer 20, and the piston valve sheet 11H, as illustrated in FIG. 7(b). The working fluid LH thus flows into the region EH to release the seal formed between the tapered portion 12TH and the piston valve sheet 11H. The working fluid LH then flows into a region EA formed between the piston valve sheets 11H and 11B. Based on the pressure loss of the introduced working fluid LH produced in the gap d between the piston valve body 12A and the inner wall of the penetration hole 13, the working fluid LH moves the piston valve 12 toward the cylinder bottom 9. The tapered portion 12TB contacts the piston valve sheet 11B to form a seal preventing the working fluid LH from flowing out to the cylinder bottom side oil chamber 13B, as illustrated in FIG. 7(c). The piston rod 3 thereby moves toward the cylinder bottom 9 corresponding to the flow of the working fluid LH flowing into the cylinder head side oil chamber 13H.

Figure 8:
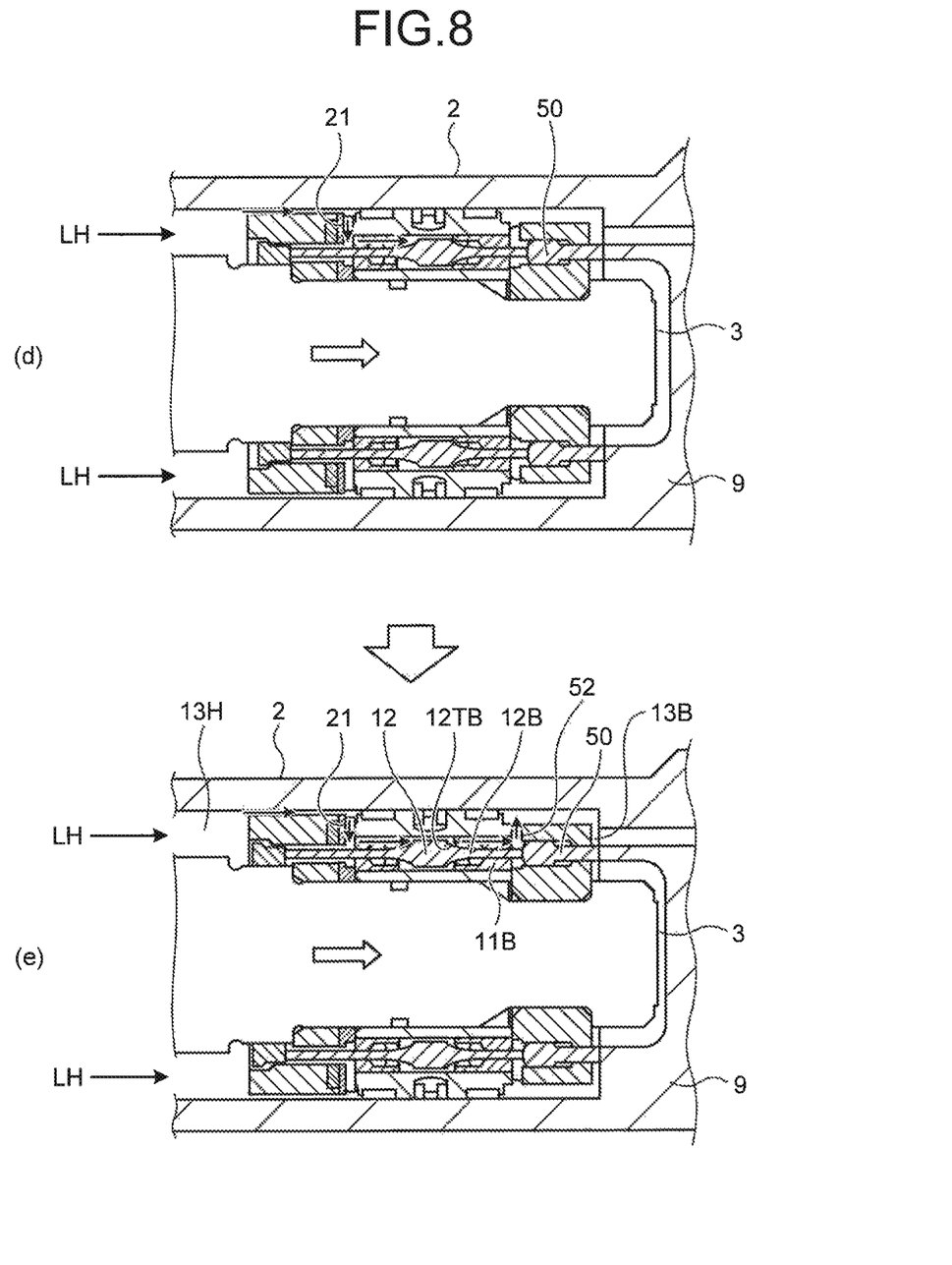
FIG. 8 is an explanatory drawings illustrating a motion of the piston valve when the piston rod contacts the cylinder bottom.
Figure 9:
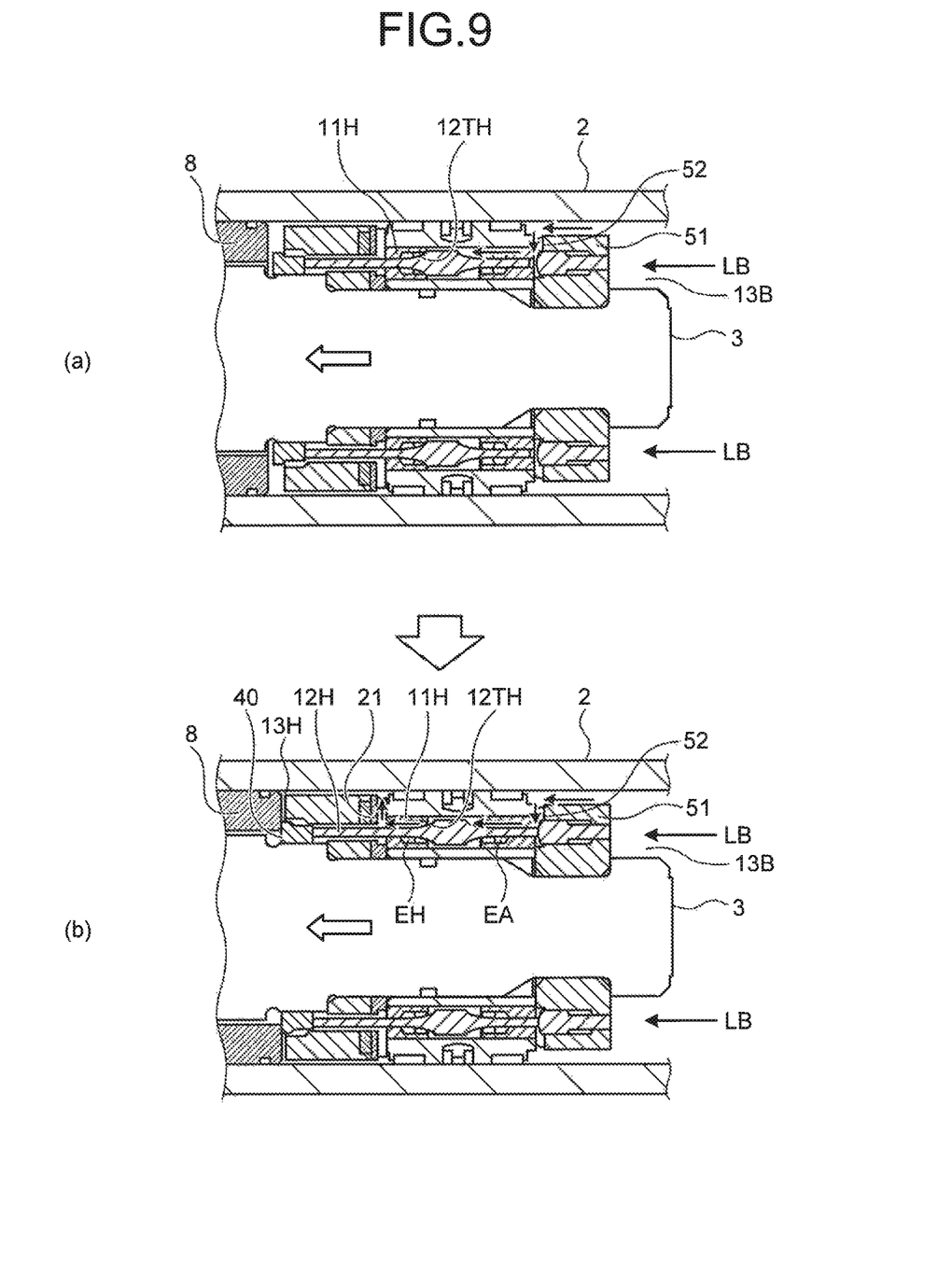
FIG. 9 is an explanatory drawings illustrating a motion of the piston valve when the piston rod contacts the cylinder head.

Then, as illustrated in FIG. 8(d), when the piston rod 3 comes closer to the cylinder bottom 9, the end of the valve piston 50 facing the cylinder bottom 9 contacts the cylinder bottom 9. As illustrated in FIG. 8(e), when the piston rod 3 comes further closer to the cylinder bottom 9, the valve piston 50 is pushed by the cylinder bottom 9 to slide toward the cylinder head 8. The valve piston 50 then pushes the cylinder bottom side operating piece 12B which is in contact with the end, facing the cylinder head 8, of the valve piston 50. Consequently, the seal formed between the tapered portion 12TB and the piston valve sheet 11B is released. When the seal is released, the working fluid LH introduced from the cylinder head side oil chamber 13H is further discharged to the cylinder bottom side oil chamber 13B through the groove 52. In this manner, the shock caused by the piston rod 3 contacting the cylinder bottom 9 can be moderated.

The shock caused by the piston rod 3 contacting the cylinder head 8 can also be moderated. As illustrated in FIG. 9(a), when the working fluid LB is kept introduced from the cylinder bottom side oil chamber 13B with a seal formed between the tapered portion 12TH and the piston valve sheet 11H, the piston rod 3 moves closer to the cylinder head 8. When the working fluid LB is further kept introduced, the slider 40 contacts the cylinder head 8 as illustrated in FIG. 9(b). The slider 40 then pushes the cylinder head side operating piece 12H toward the cylinder bottom 9. Consequently, the seal formed between the tapered portion 12TH and the piston valve sheet 11H is released. When the seal is released, the working fluid LB introduced from the cylinder bottom side oil chamber 13B is further discharged to the cylinder head side oil chamber 13H through the groove 21. In this manner, the shock caused by the piston rod 3 contacting the cylinder head 8 can be moderated.

Figure 10:
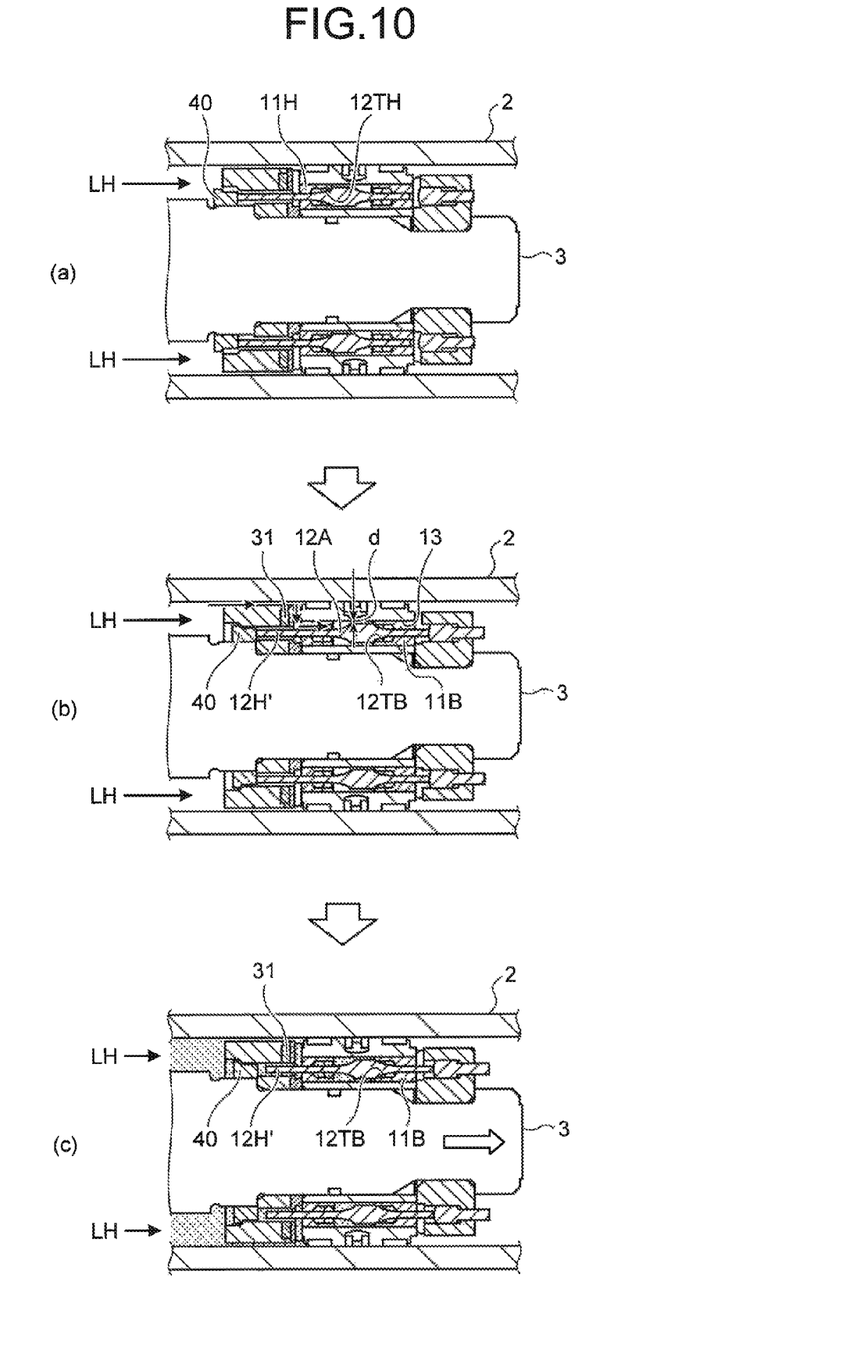
FIG. 10 is an explanatory drawings illustrating a motion of the piston valve where the slider is made of a magnetic material.

FIG. 10 is an explanatory drawings illustrating a motion of the piston valve where the slider 40 is made of a magnetic material. In FIG. 10(a), as in a manner illustrated in FIG. 7(a), the seal formed between the tapered portion 12TH and the piston valve sheet 11H is released by introducing the working fluid LH. Then in FIG. 10(b), as in a manner illustrated in FIG. 7(b), based on the pressure loss of the working fluid LH produced in the gap d between the piston valve body 12A and the inner wall of the penetration hole 13, the working fluid LH moves the piston valve 12 toward the cylinder bottom 9. The slider 40 made of a magnetic material adheres to the cylinder head side operating piece 12H' since the cylinder head side operating piece 12H' is magnetized by the magnet 31.

Therefore, even when the working fluid LH is kept introduced, the force applied to the piston valve 12 is required to be larger than the force attracting the cylinder head side operating piece 12H' and the slider 40 together. The force applied to the piston valve 12 is equivalent to the pressure loss of the working fluid LH in the gap d. When the flow of the working fluid LH is small, the pressure loss is small. Therefore, in the initial state in moving the piston rod 3 where the flow is very small, the force applied to the piston valve 12 is small. Further, a force greater than the force attracting the cylinder head side operating piece 12H and the slider 40 together is required. Therefore, as illustrated in FIG. 10(b), the tapered portion 12TB and the piston valve sheet 11B are kept in a state with no seal formed in between. Then, as illustrated in FIG. 10(c), when the working fluid LH is further introduced, a seal is formed between the tapered portion 12TB and the piston valve sheet 11B, thereby moving the piston rod 3 toward the cylinder bottom 9.

(Comparison of Operability)

Figure 11:
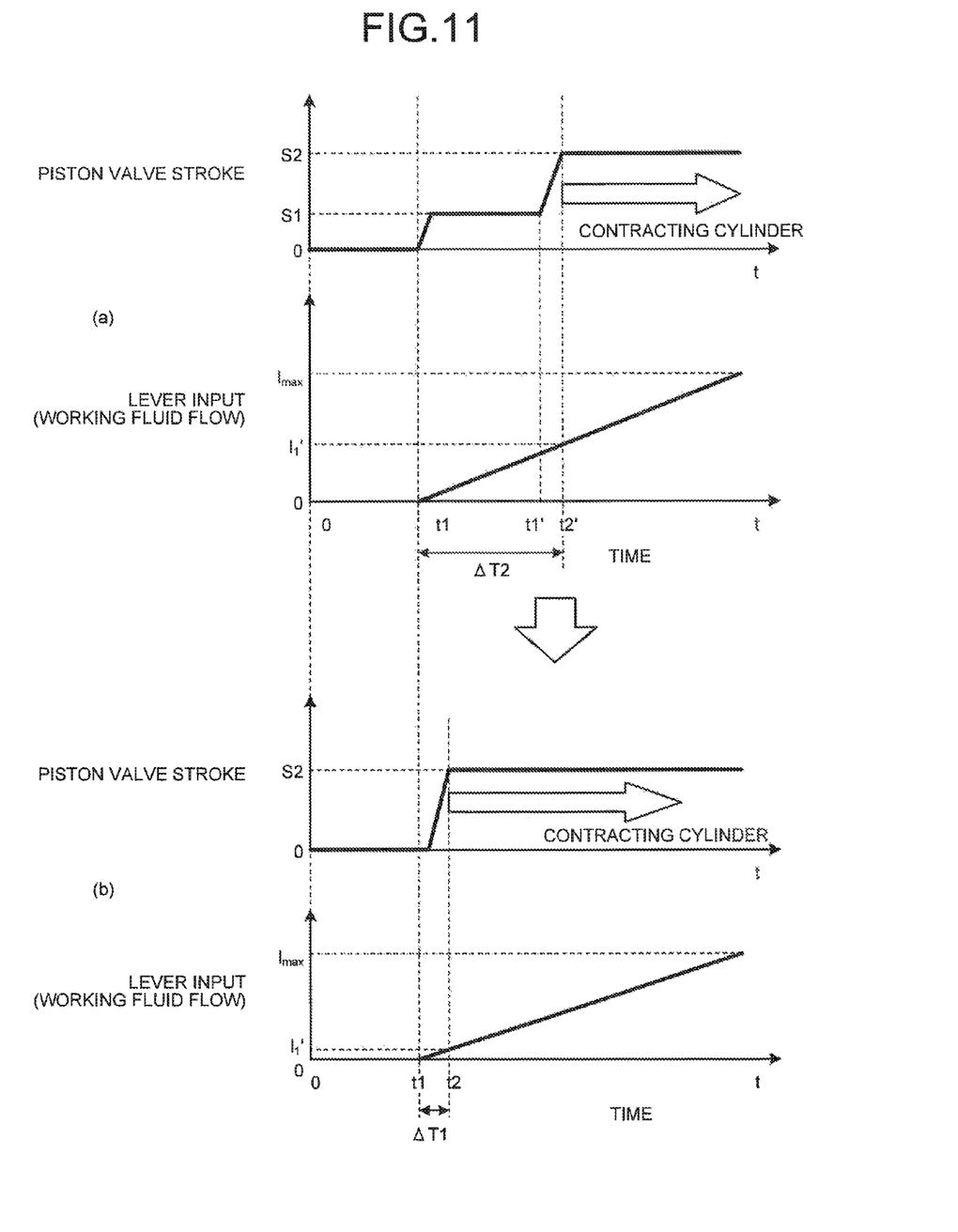
FIG. 11 illustrates change in the piston valve stroke in relation with chronological change in a lever input for each of the cases where the slider is made of a magnetic material and a nonmagnetic material.

FIG. 11(a) illustrates the change in the piston valve stroke in relation with the chronological change in a lever input (amount of flow of working fluid) where the slider 40 is made of a magnetic material. As illustrated in FIG. 11(a), with the slider 40 made of a magnetic material, when the lever input starts increasing from 0 at a point of time t1, the piston valve stroke increases because the cylinder head side operating piece 12H' is adhering to the slider 40. However, the piston valve stroke stays constant at S1. The piston valve stroke stays constant until the introduced flow of the working fluid LH increases, in response to the increase in the lever input as described above, to produce the force greater than the attraction force between the cylinder head side operating piece 12H' and the slider 40. Then, when the produced force becomes greater than the attraction force between the cylinder head side operating piece 12H' and the slider 40 to separate the cylinder head side operating piece 12H' and the slider 40 at a point of time t1', the piston valve 12 starts moving, and at a point of time t2', the piston valve stroke becomes S2 and a seal is formed. From the point of time t2' onward, the piston rod 3 moves in the direction contracting the cylinder (toward the cylinder bottom 9).

Meanwhile, in the embodiment, the slider 40 is made of a nonmagnetic material and therefore does not adhere to the cylinder head side operating piece 12H'. Thus, as illustrated in FIG. 11(b), when the lever input starts increasing from 0 at the point of time t1, the piston valve 12 moves in response to the lever input. This is because the cylinder head side operating piece 12H' is allowed to make contact with, not adhere to, the slider 40, and therefore the pressure loss of the working fluid LH in the gap d is fully used to move the piston valve 12, that is, to increase the piston valve stroke. Then at a point of time t2, the piston valve stroke becomes S2 and a seal is formed. From the point of time t2 onward, the piston rod 3 moves in the direction contracting the cylinder (toward the cylinder bottom 9).

In FIG. 11(a), the piston valve stroke increases by two steps in response to the lever input, which results in a long time period ΔT2 before the piston rod 3 starts moving. Contrarily, in the present embodiment, the piston rod 3 starts moving after an actual time period ΔT1 instead of the time period ΔT2. As a result, an operator does not feel a time-lag when the piston rod 3 moves in response to the lever input, keeping preferable operability when reciprocating the piston rod 3.

(Length of Cylinder Head Side Operating Piece)

The cylinder head side operating piece 12H is preferably longer than the length (LA in FIG. 7(c)) allowing the piston valve body 12A of the piston valve 12 to be kept in contact with the slider 40 when moving within a range between the piston valve sheets 11H and 11B. With the cylinder head side operating piece 12H being provided with such length, the seal formed between the tapered portion 12TH and the piston valve sheet 11H can surely be released when the slider 40 contacts the cylinder head 8. If the cylinder head side operating piece 12H is provided with such length, the slider 40 may be made of a magnetic material.

(Lines of Magnetic Force of Magnet)

Figure 12:
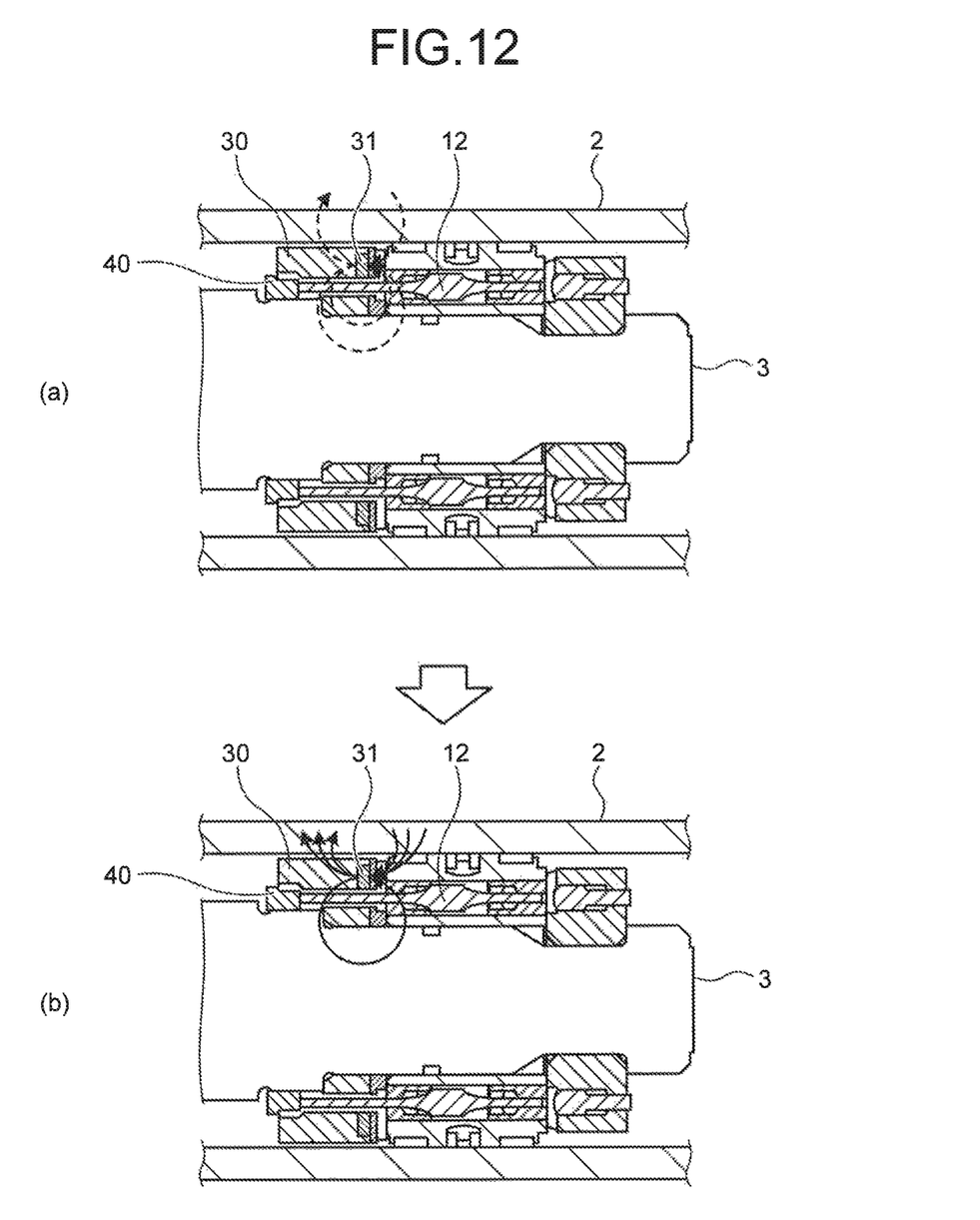
FIG. 12 illustrates a state of lines of magnetic force of a magnet for each of the cases where both the magnet holder ring and the slider are made of magnetic materials and nonmagnetic materials.

FIG. 12(a) illustrates a state of lines of magnetic force of the magnet 31 where the magnet holder ring 30 and the slider 40 are made of magnetic materials. FIG. 12(b) illustrates a state of lines of magnetic force of the magnet 31 where the magnet holder ring 30 and the slider 40 are made of nonmagnetic materials. As illustrated in FIG. 12(a), when the magnet holder ring 30 and the slider 40 are made of magnetic materials, the magnets 31 generate more lines of magnetic force in the inner side of the cylinder tube 2 where many magnetic components are disposed and less lines of magnetic force toward the cylinder tube 2. Contrarily, as illustrated in FIG. 12(b), when the magnet holder ring 30 and the slider 40 are made of nonmagnetic materials, the magnets 31 generate less lines of magnetic force toward the inner side of the cylinder tube 2 and more lines of magnetic force in the cylinder tube 2.

Thus, when the magnet holder ring 30 and the slider 40 are made of nonmagnetic materials, the magnetism detector 6 catches a larger number of lines of magnetic force and, therefore, can detect the position with high accuracy. Meanwhile, when the slider 40 is made of a magnetic material, the lines of magnetic force extending from the magnets 31 toward the cylinder tube 2 includes dispersion, which may degrade the accuracy of detecting the position by the magnetism detector 6. From this point of view, the slider 40 is preferably made of a nonmagnetic material.

REFERENCE SIGNS LIST 1 cylinder
2 cylinder tube
3 piston rod
4, 5 hydraulic port
6 magnetism detector
6a, 6b magnetic sensor
7 position detector
8 cylinder head
9 cylinder bottom
10 piston
11 piston valve sheet
11H, 11B piston valve sheet
12 piston valve
12H cylinder head side operating piece
12B cylinder bottom side operating piece
12TH, 12TB tapered portion
12A piston valve body
13H cylinder head side oil chamber
13B cylinder bottom side oil chamber
13, 15, 23, 24, 33 penetration hole
14 blind hole
20 retainer
21, 52 groove
30 magnet holder ring
31 magnet
31a magnet holder
34 through hole
40 slider
50 valve piston
51 valve piston holder
100 stroke position sensor
d gap
LH, LB working fluid

The invention claimed is:

1. A cylinder with a shock absorbing function which can detect a position of a piston rod reciprocating in a cylinder tube and has a function of absorbing shock produced by the piston rod at its stroke end, the cylinder with a shock absorbing function comprising:
   a pair of piston valve sheets provided in a piston unit attached to a region of the piston rod closer to a cylinder bottom, one of the pair of piston valve sheets being disposed closer to a cylinder head and the other being disposed closer to a cylinder bottom;
   a piston valve configured to reciprocate within a range between the piston valve sheets in a manner that the piston valve is moved toward the cylinder bottom by working fluid introduced from a cylinder head side oil chamber to form a seal between the piston valve and the piston valve sheet disposed closer to the cylinder bottom so as to prevent the working fluid from flowing out toward the cylinder bottom, and that the piston valve is moved toward the cylinder head by working fluid introduced from a cylinder bottom side oil chamber to form a seal between the piston valve and the piston valve sheet disposed closer to the cylinder head so as to prevent the working fluid from flowing out toward the cylinder head;

a slider made of a nonmagnetic material slidably fitted onto the piston rod and allowed to make contact with the cylinder head and a cylinder head side operating piece of the piston valve;

a valve piston provided in the piston unit in a region closer to the cylinder bottom and configured to push the piston valve toward the cylinder head when the piston rod contacts a stroke end at the cylinder bottom, thereby releasing a seal formed between the piston valve and the piston valve sheet disposed closer to the cylinder bottom;

a magnet holder ring attached to the piston rod so as to be positioned between the piston unit and the slider, and configured to secure a magnet for detecting a position of the piston rod on a side facing the piston unit; and a magnetism detector provided on an outer periphery of the cylinder tube and configured to detect a position of the piston rod by detecting magnetism generated by the magnet.

2. The cylinder with a shock absorbing function according to claim 1, wherein the cylinder head side operating piece of the piston valve is longer than a length allowing the piston valve to be kept in contact with the slider while the piston valve is moving within a range between the pair of piston valve sheets.

3. The cylinder with a shock absorbing function according to claim 1, further comprising a retainer provided between the piston unit and the magnet holder ring, and configured to secure the piston valve sheet disposed closer to the cylinder head and the magnet in the magnet holder ring in position, the retainer forming a passage for introducing working fluid in a region between the pair of piston valve sheets.

4. The cylinder with a shock absorbing function according to claim 2, further comprising a retainer provided between the piston unit and the magnet holder ring, and configured to secure the piston valve sheet disposed closer to the cylinder head and the magnet in the magnet holder ring in position, the retainer forming a passage for introducing working fluid in a region between the pair of piston valve sheets.

* * * * *